(12) United States Patent
Li et al.

(10) Patent No.: US 11,945,302 B2
(45) Date of Patent: Apr. 2, 2024

(54) LOW-FLOOR ELECTRIC AXLE ASSEMBLY

(71) Applicant: TSINGHUA UNIVERSITY, Beijing (CN)

(72) Inventors: Jian-Qiu Li, Beijing (CN); Jia-Yi Hu, Beijing (CN); Liang-Fei Xu, Beijing (CN); Bing-Kun Cai, Beijing (CN); Hang Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 722 days.

(21) Appl. No.: 17/096,953

(22) Filed: Nov. 13, 2020

(65) Prior Publication Data
US 2021/0061093 A1  Mar. 4, 2021

Related U.S. Application Data

(63) Continuation of application No. PCT/CN2018/116577, filed on Nov. 21, 2018.

(30) Foreign Application Priority Data

May 14, 2018 (CN) .................... 201810454446.X

(51) Int. Cl.
*B60K 17/14* (2006.01)
*B60B 35/00* (2006.01)
(Continued)

(52) U.S. Cl.
CPC ............ *B60K 17/14* (2013.01); *B60B 35/002* (2013.01); *B60G 9/00* (2013.01); *B60G 17/08* (2013.01);
(Continued)

(58) Field of Classification Search
CPC .......... B60K 7/0007; B60K 2007/0092; B60K 17/14; B60K 35/002
See application file for complete search history.

(56) References Cited

U.S. PATENT DOCUMENTS

| 6,328,123 | B1 | 12/2001 | Niemann et al. | |
| 2021/0221218 | A1* | 7/2021 | Li | H02K 24/00 |
| 2022/0242223 | A1* | 8/2022 | Yu | B60K 17/046 |

FOREIGN PATENT DOCUMENTS

| CN | 104290721 A | * 1/2015 | .............. B60T 1/062 |
| CN | 104908581 | 9/2015 | |

(Continued)

OTHER PUBLICATIONS

International Search Report of PCT/CN2018/116577.

*Primary Examiner* — Katy M Ebner

(57) ABSTRACT

A low-floor electric axle assembly including: an axle housing, two hub motors, two planetary gear reducers, two hubs, a brake system, two C-shaped beams, and a suspension system. Mechanical mounting of the suspension system is compatible with a conventional axle. The axle housing has a left and right symmetrical dumbbell-shaped structure configured to bear a weight of a vehicle. The hub motors are inner rotor type motors and are separately arranged at two ends of the axle housing left and right symmetrically. The hub motors are arranged coaxially with two wheels respectively. Two hub motor rotors are connected to the planetary gear reducers respectively. Each of the planetary gear reducers is a single-stage planetary gear reducer. A sun gear of each of the planetary gear reducers receives power outputted by each of the hub motor. Two planetary gear reducer housings are power output ends connected to two rims respectively.

12 Claims, 7 Drawing Sheets

(51) Int. Cl.
  *B60G 9/00* (2006.01)
  *B60G 17/08* (2006.01)
  *B60K 7/00* (2006.01)
  *B60T 1/06* (2006.01)
  *F16H 1/28* (2006.01)
  *F16H 57/04* (2010.01)
  *H02K 7/00* (2006.01)
  *H02K 7/08* (2006.01)
  *H02K 7/102* (2006.01)
  *H02K 7/116* (2006.01)
  *H02K 9/19* (2006.01)

(52) U.S. Cl.
  CPC ............ *B60K 7/0007* (2013.01); *B60T 1/065* (2013.01); *F16H 1/28* (2013.01); *F16H 57/0476* (2013.01); *F16H 57/0486* (2013.01); *H02K 7/006* (2013.01); *H02K 7/083* (2013.01); *H02K 7/102* (2013.01); *H02K 7/116* (2013.01); *H02K 9/19* (2013.01); *B60G 2202/242* (2013.01); *B60K 2007/0092* (2013.01); *F16H 2001/2881* (2013.01)

(56) References Cited

FOREIGN PATENT DOCUMENTS

| | | | | |
|---|---|---|---|---|
| CN | 106864251 | | 6/2017 | |
| CN | 206416829 U | * | 8/2017 | |
| CN | 107487175 | | 12/2017 | |
| CN | 104908581 B | * | 4/2018 | |
| CN | 107933300 | | 4/2018 | |
| CN | 108016287 A | * | 5/2018 | ........... B60B 35/002 |
| CN | 108016288 | | 5/2018 | |
| CN | 108016288 A | * | 5/2018 | ........... B60B 35/002 |
| CN | 108638839 | | 10/2018 | |
| CN | 208855328 U | * | 5/2019 | |
| CN | 212447100 U | * | 2/2021 | |
| DE | 19624533 | | 1/1998 | |
| EP | 1266784 | | 12/2002 | |
| EP | 1690725 | | 8/2006 | |
| KR | 20150007674 | | 1/2015 | |
| WO | WO-2022098235 A1 | * | 5/2022 | |

* cited by examiner

LOW-FLOOR ELECTRIC AXLE ASSEMBLY

CROSS-REFERENCE TO RELATED APPLICATIONS

This application claims all benefits accruing under 35 U.S.C. § 119 from China Patent Application No. 201810454446.X, filed on May 14, 2018 in the China National Intellectual Property Administration, the entire content of which is hereby incorporated by reference. This application is a continuation under 35 U.S.C. § 120 of international patent application PCT/CN2018/116577, entitled "LOW-FLOOR ELECTRIC AXLE ASSEMBLY" filed on Nov. 21, 2018, the content of which is also hereby incorporated by reference.

TECHNICAL FIELD

The present disclosure relates to the field of new energy vehicle drive technologies, and in particular to a low-floor electric axle assembly.

BACKGROUND

FIG. 1 shows a centralized drive manner of a conventional electric coach commonly used in the prior art. A powertrain system includes a drive motor, a reducer (or a transmission), a transmission shaft, and a drive axle, including the defects of a long transmission chain and relatively low transmission efficiency. Moreover, these components occupy a majority of space of a vehicle's longitudinal beam, thus affecting an overall layout and weight. When the powertrain system is applied to the coach, it causes the floor of the coach to be relatively high.

In the prior art, a low-floor electric axle of the coach adopts a distributed drive manner. Wheel-side motors or in-wheel motors are commonly used, and two drive motors are symmetrically arranged at two sides of an axle housing. However, a motor axis is generally parallel or perpendicular to a wheel axis, and the motor adopts two-stage reduction. FIG. 2 and FIG. 3 show structures of floor electric drive axles of a typical arrangement manner in which an axis of a motor is parallelly arranged. FIG. 2 shows an arrangement solution of a patent of "IN-WHEEL ELECTRIC DRIVE REDUCTION LOW-FLOOR AXLE" (patent number: CN203427602U), and FIG. 3 shows an arrangement solution of a patent of "LOW-FLOOR GATE-TYPE IN-WHEEL MOTOR REAR AXLE FOR ELECTRIC PASSENGER CAR" (patent number: CN102555773A). According to the foregoing solutions, power outputted by the motor is first transmitted by a first-stage cylindrical gear located at the wheel side, and then outputted to a planetary gear reducer at the wheel side. Both the first-stage cylindrical gear reducer and a mechanic brake system are arranged between the motor and the second-stage planetary gear reducer. A brake caliper and a brake air chamber are arranged above the brake disc, and the cylindrical gear reducer and the brake caliper occupy a relatively large axial space. Moreover, FIG. 4 shows a structure of a floor electric drive axle of a typical arrangement manner in which an axis of a motor is perpendicularly arranged. FIG. 4 shows an arrangement solution of a patent "IN-WHEEL ELECTRIC AXLE" (patent number: CN101830172A), and shows a typical arrangement manner in which an axis of the motor is perpendicularly arranged. Power outputted by the motor is first transmitted by a bevel gear or a hypoid gear located at the wheel side, and then outputted to a planetary gear reducer at the wheel rim. According to such an arrangement manner of adopting the double reduction and using the bevel gear or the hypoid gear, transmission efficiency is relatively low, and occupied space is relatively large. The brake system of this type of low-floor electric axle is disposed between a bevel gear reduction mechanism and an in-wheel reducer, and also occupies a relatively large axial space, thus affecting a width of a low-floor part, that is, a width of a coach aisle.

Therefore, according to the prior art, a low-floor electric axle assembly which can achieve a high-transmission-ratio gear and ensure transmission efficiency, is urgently required.

SUMMARY

To overcome defects existing in the prior art, the present disclosure provides a driving solution of two distributed-drive hub motors. A motor is arranged coaxially with a rim, a single-stage cylindrical gear drive, bevel gear drive, or hypoid gear drive is removed. An unconventional-structure planetary gear reducer is provided to ensure a high transmission ratio and transmission efficiency. A brake system is arranged at two ends of the axle and at an inner inside of the motor, thereby making full use of space at the two ends of the axle, and forming a low-floor electric axle assembly.

To achieve the foregoing objectives, the present disclosure provides the following technical solutions.

A low-floor electric axle assembly is provided, including an axle housing, hub motors, planetary gear reducers, hubs, a brake system, C-shaped beams, and a suspension system, wherein mechanical mounting of the suspension system is compatible with a conventional axle, and arrangement manners of the brake system, the hub motors, and the planetary gear reducers are capable of expanding a width of a passenger car aisle.

In some embodiments, the axle housing has a left and right symmetrical dumbbell-shaped structure configured to bear a vehicle's weight.

The hub motors are inner rotor type motors and are separately arranged at two ends of the axle housing left and right symmetrically. Each of the hub motors is arranged coaxially with a wheel, and a hub motor rotor is connected to the planetary gear reducer.

Each of the planetary gear reducers is a single-stage planetary gear reducer. A sun gear of the planetary gear reducer receives power outputted by the hub motor, and a planetary gear reducer housing is a power output end connected to a rim, to transmit the power to the wheel.

Each of the hubs is supported over a motor output shaft sleeve through a bearing, and is connected to the planetary gear reducer housing and the rim.

The brake system is a disc mechanic brake powered by variable pneumatic pressure or variable hydraulic pressure, and comprises brake discs, brake calipers, and brake air chambers or hydraulic brake cylinders. Each of the brake discs is mounted at an output end of the hub motor rotor. The brake calipers are mounted at two ends of the axle housing. Each of the brake air chambers or each of the hydraulic brake cylinders is arranged at a hollow position of a middle beam of the axle housing.

Each of the C-shaped beams is in a C-shaped structure, and is arranged at a side surface of each of half-cylinder structures of the two ends of the axle housing and configured to mount the hub motors.

The suspension system is a four-air-bag suspension. An air bag assembly and a damper assembly are disposed on each of the C-shaped beams, and a push rod assembly is disposed on the axle housing.

In some embodiments, the two ends of the axle housing each are in a half-cylinder shape, each half-cylinder shape fits an outer contour of the hub motor, and each of the half-cylinder structures is provided with a mounting hole for the hub motor.

In some embodiments, each of the hub motors is detachably disposed in the half-cylinder structure of the axle housing from an opening at a top of the half-cylinder structure. Each of the hubs and the reducer housings of the planetary gear reducers extend out from an end surface of the half-cylinder structure. The C-shaped beams configured to arrange the suspension system are respectively disposed at a front position and a rear position of a side surface of each of the half-cylinder structures of the axle housing. A middle part of the axle housing is provided with a V-shaped bracket to mount a suspension push rod.

In some embodiments, each of the hub motors is an inner rotor motor supported by the axle housing, and the hub motor bears no vehicle weight.

In some embodiments, each of the hub motors comprises a hub motor stator, the hub motor rotor, a hub motor rotor output shaft, and a hub motor housing; the hub motor rotor output shaft is fixedly connected to the hub motor rotor and extends out from end surfaces of two sides of the hub motor. One end of the hub motor output shaft, which is proximate to an inner side of the wheel, is fixedly connected to the brake disc. Another end of the hub motor output shaft, which is proximate to an outer side of the wheel, penetrates the planetary gear reducer and is fixedly connected to the sun gear. The hub motor housing is disposed in the half-cylinder structure of each of the two ends of the axle housing; an end of the hub motor housing, which is proximate to the outer side of the wheel, is provided with a sleeve arranged coaxially with the hub motor rotor output shaft. A bearing is arranged between the sleeve and the hub motor rotor output shaft to support the hub motor rotor output shaft. An outer side of the sleeve is fixedly connected to a gear ring of the planetary gear reducer, and the hub motor transmits the power to the hub through the planetary gear reducer.

In some embodiments, the planetary gear reducer is a single-stage high transmission ratio planetary gear reducer with an unconventional-structure planetary gear, to achieve a high-ratio gear and ensure transmission efficiency.

In some embodiments, each of the planetary gear reducers comprises the reducer housing, the sun gear, planetary gear pins, and a gear ring. The reducer housing is a planetary carrier of the planetary gear reducer and the power output end of the planetary gear reducer. The sun gear, the planetary gear pins, and the gear ring are all arranged in the reducer housing. The sun gear is an input end of the planetary gear reducer, and is fixedly connected to the hub motor rotor output shaft. The planetary gear pins each are fixed on the reducer housing to support a planetary gear. Multiple planetary gears each are connected to the reducer housing through respective planetary gear pins, and mesh with the sun gear to transmit the power inputted by the hub motor. The gear ring is sleeved on the planetary gears and meshed with the planetary gears, and is fixed on a hub motor rotor output shaft sleeve.

In some embodiments, each of the planetary gears comprises a primary gear and a secondary gear. The primary gear meshes with the sun gear. The secondary gear is arranged coaxially with the primary gear and meshes with the gear ring, and a number of teeth of the secondary gear is less than a number of teeth of the primary gear.

In some embodiments, the hub motor rotor output shaft sleeve is arranged in the reducer housing. A flange surface is disposed on a side of the reducer housing, which is proximate to the hub motor. The flange surface fits a flange surface of the hub and a flange surface on the rim. A main body of the hub is disposed inside the reducer housing. A wheel main bearing is arranged between the hub and the hub motor rotor output shaft sleeve.

In some embodiments, the brake system is arranged at an inner side of the wheel, and the brake disc is fixedly connected to an end of the hub motor rotor output shaft, which is located at an inner side of the wheel, thus reducing a braking torque. A diameter of the brake disc, and a volume of the brake air chamber or the hydraulic brake cylinder are relatively small.

In some embodiments, the brake calipers are disposed inside the half-cylinder structures of the two ends of the axle housing, and the brake air chamber or the hydraulic brake cylinder is transversely arranged in hollow space of the middle beam of the axle housing, to shorten an axial length of an entire in-wheel system.

In some embodiments, the C-shaped beam for mounting the air bag assembly and a mounting structure for mounting a longitudinal push rod assembly are arranged at an inner side surface of the half cylinder structure of the axle housing. A V-shaped bracket for mounting an inclined push rod assembly is arranged in the middle part of the axle housing.

In some embodiments, the hub motors and the planetary gear reducers adopt an integral direct oil cooling manner, to improve a cooling level of the hub motor, and to ensure lubrication and cooling effects of the planetary gear reducer.

Beneficial effects of the present disclosure include:

(1) Each of the hub motors is arranged coaxially with the wheel, and only a high-transmission-ratio planetary gear reducer with unconventional-structure planetary gears is employed as a transmission. Compared with a solution of conventional motors with parallelly arranged axes, the present disclosure removes a reduction mechanism of a single-stage cylindrical gear. Compared with a solution of the wheel-side motors arranged longitudinally, the present disclosure removes a bevel gear drive or a hypoid gear drive. Therefore, compared with the foregoing two solutions, the present disclosure achieves higher transmission efficiency and saves more space, which is beneficial to the widening of the width of the coach aisle.

(2) The in-wheel reducer is the unconventional-structure planetary gear reducer, and the planetary gears are divided into two stages, thereby ensuring the high transmission ratio, and ensuring the volume to be smaller in the case of high efficiency.

(3) The brake system is arranged at the inner side of the wheel, and the brake calipers and the like are disposed at the two ends of the axle housing. Compared with the common solution that the brake system is arranged between the motor and the in-wheel reducer, the present disclosure is beneficial to the shortening of the axial length of the entire in-wheel system, thereby making the coach aisle wider.

(4) The track width and the suspension mounting are compatible with a mounting interface of the conventional axle, and it is convenient to adopt a suspension form of four air bags. Mounting manners of connecting and limiting mechanisms, such as the push rod, etc., remain unchanged.

(5) The hub motor and the planetary gear reducer can adopt the integral direct oil cooling manner, thus improving

DETAILED DESCRIPTION OF THE EMBODIMENTS

Figure 1:
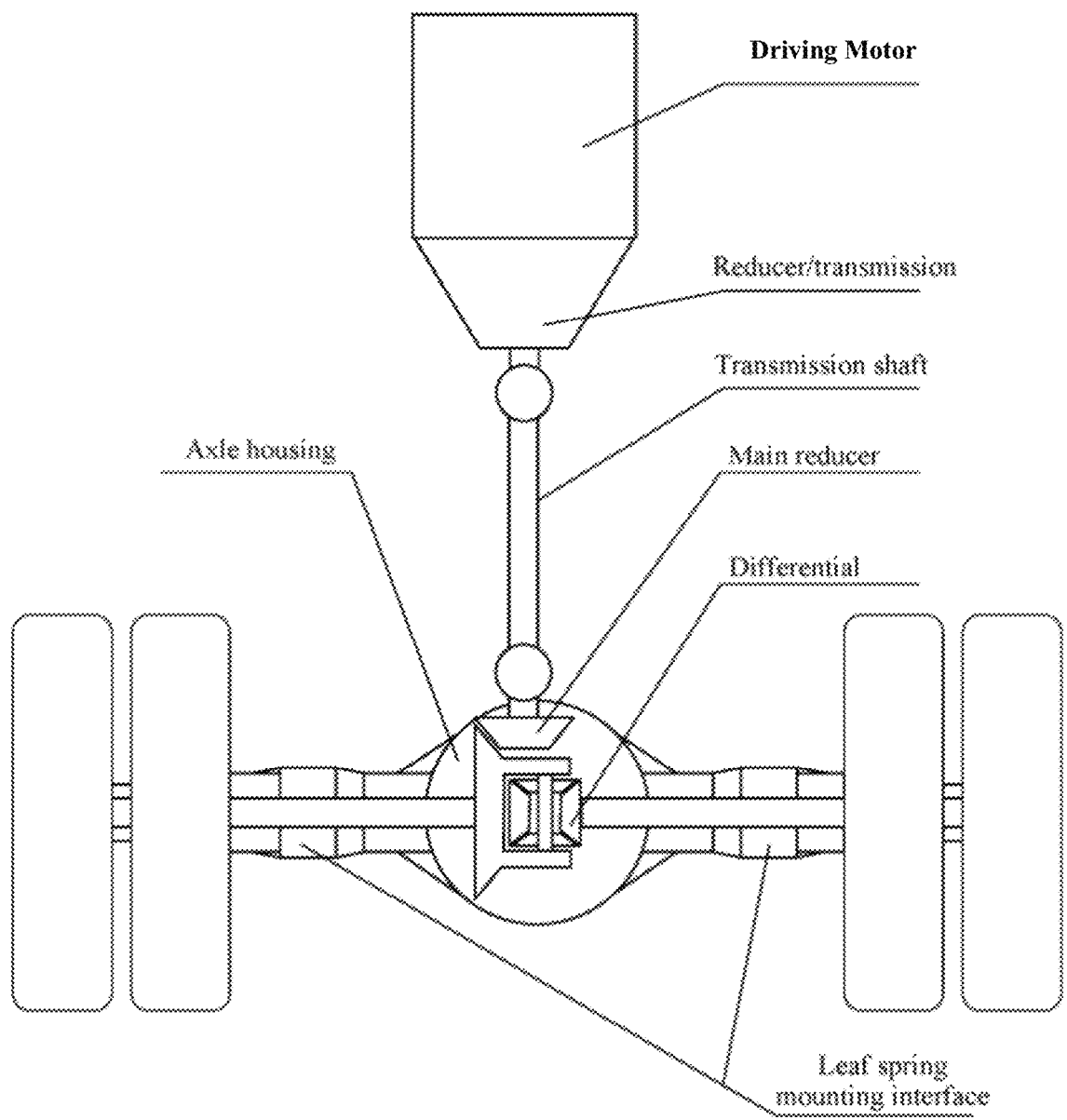
FIG. 1 is a schematic structural diagram of a conventional electric drive system.
Figure 2:
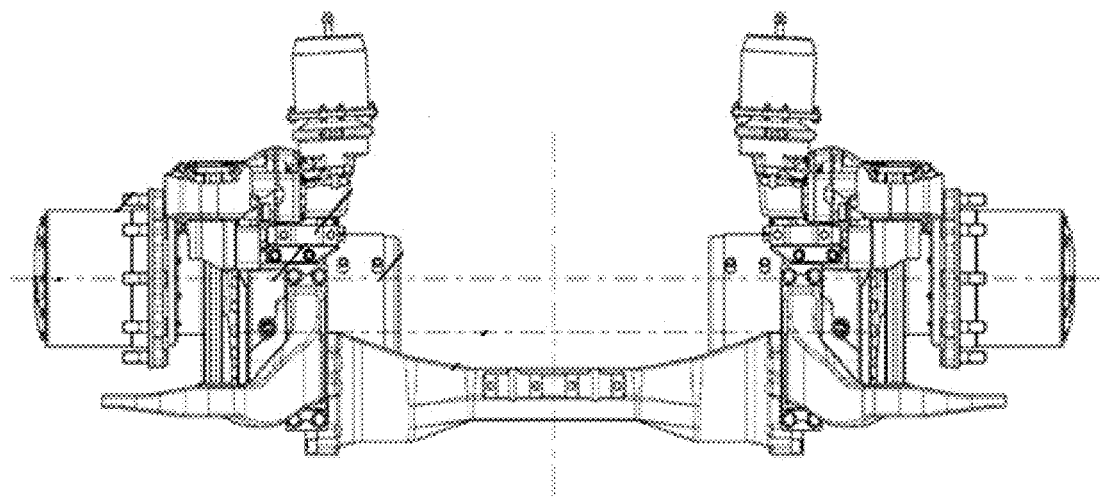
FIG. 2 is a structural diagram of a low-floor electric drive axle of a typical arrangement manner in which an axis of a motor is parallel arranged.
Figure 3:
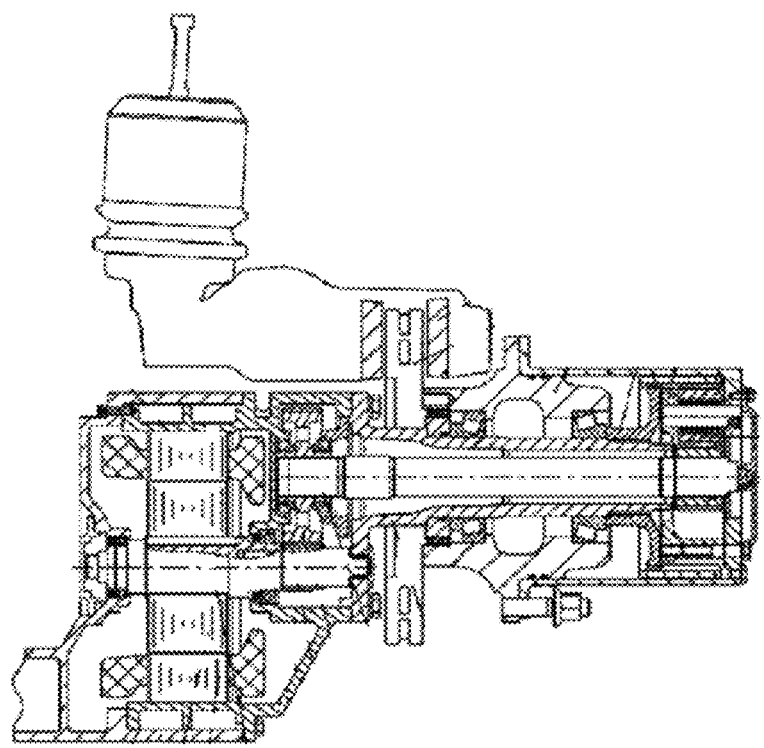
FIG. 3 is a cross-sectional view illustrating a structure of a low-floor electric drive axle of a typical arrangement manner in which an axis of an in-wheel motor is parallel arranged.
Figure 4:
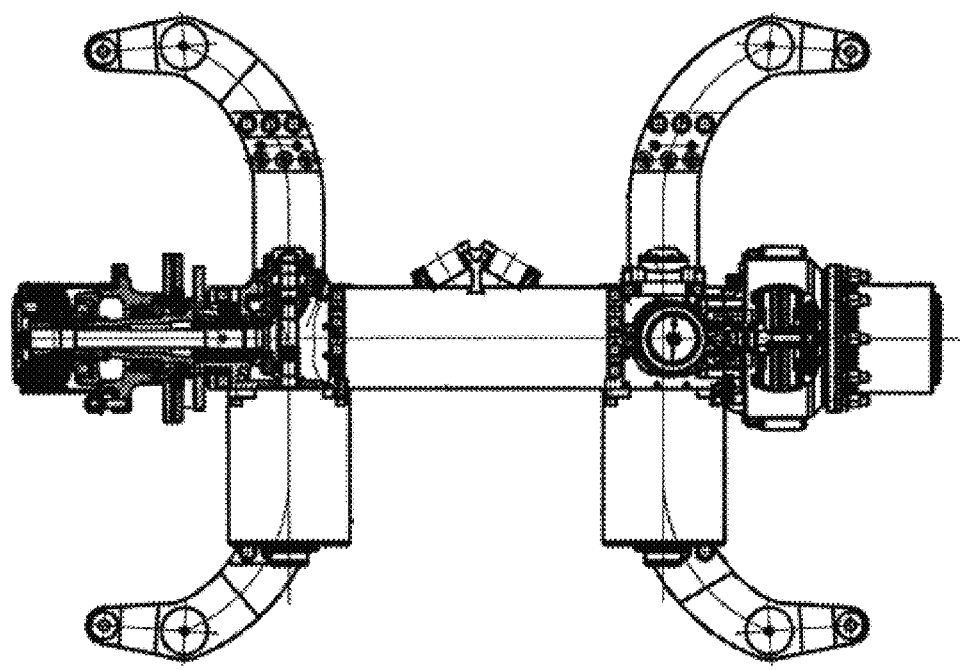
FIG. 4 is a structural diagram of a low-floor electric drive axle of a typical arrangement manner in which an axis of a motor is a perpendicularly arranged.
Figure 5:
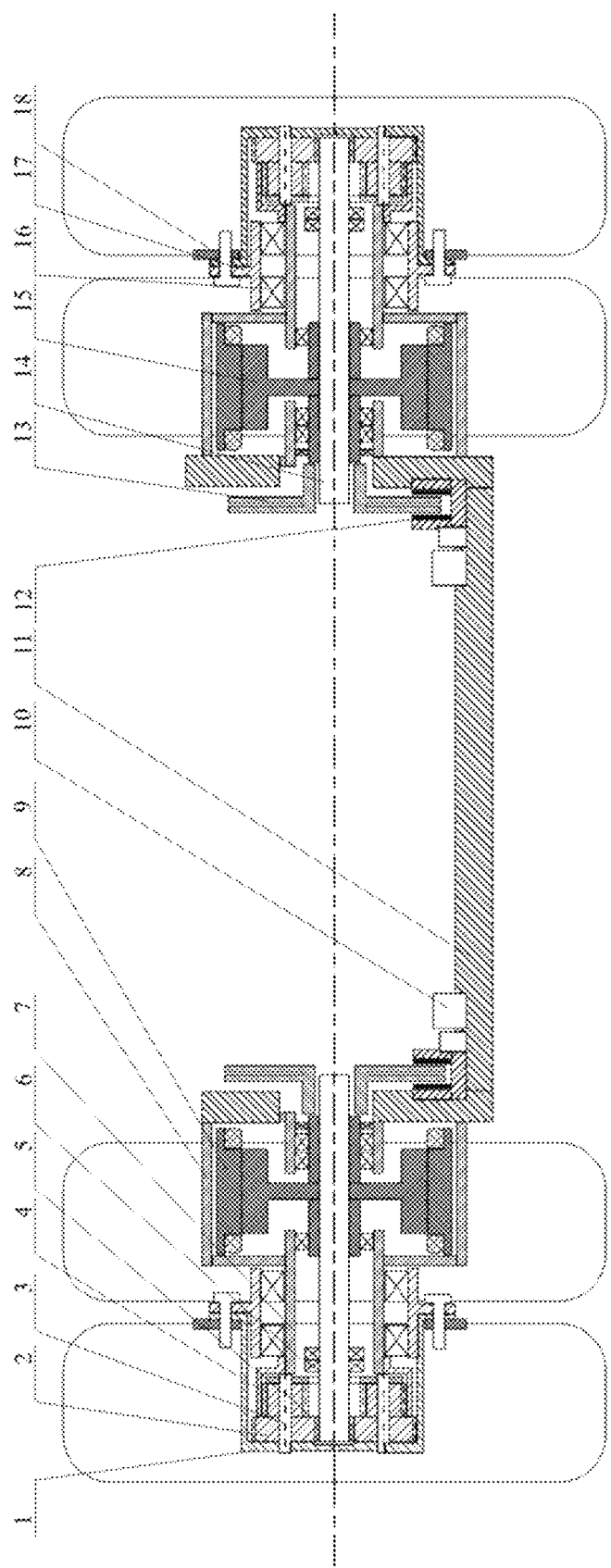
FIG. 5 is a front view of a low-floor electric axle assembly of the present disclosure.
Figure 6:
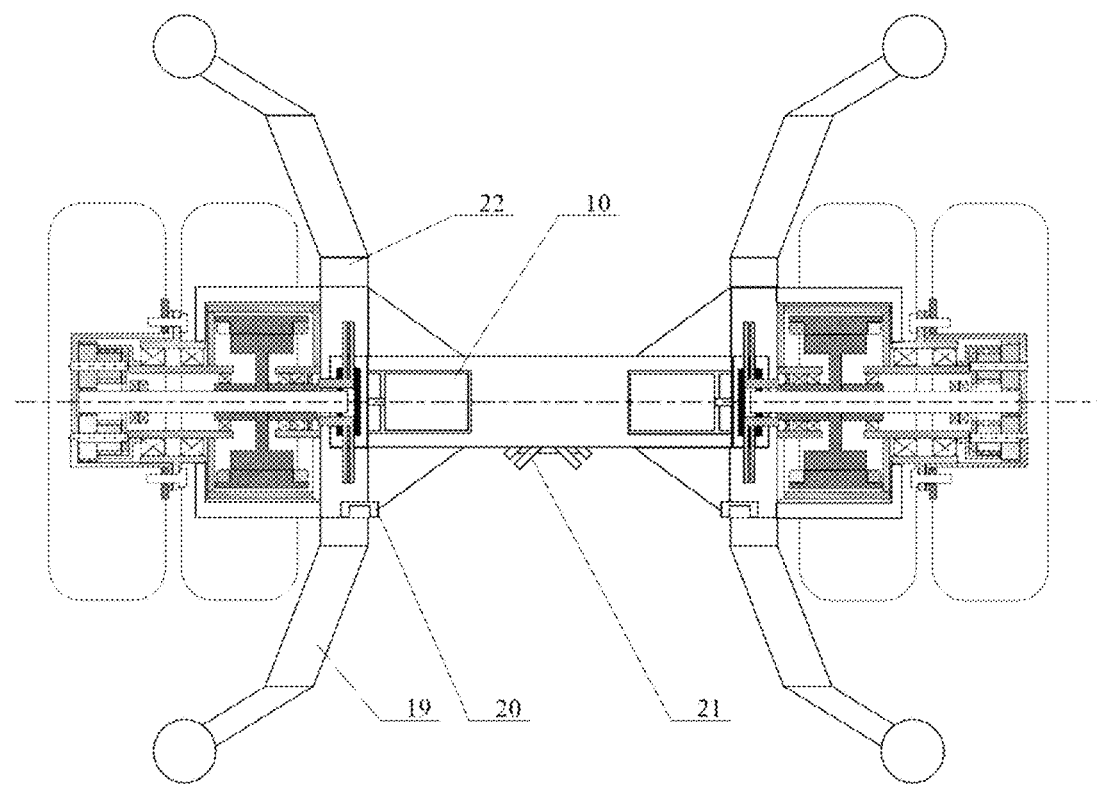
FIG. 6 is a top view of the low-floor electric axle assembly of the present disclosure.

To make the objective, technical solutions, and advantages of embodiments of the present disclosure clearer, the technical solutions of the embodiments of the present disclosure will be further described hereafter with reference to accompanying drawings of the embodiments of the present disclosure in detail. In the accompanying drawings, same or similar reference numerals throughout the description denote e same or similar elements, or elements having the same or similar functions. The described embodiments are merely a part rather than all of the embodiments of the present disclosure. Both the embodiments and the directional words described below with reference to the accompanying drawings are exemplary, and are intended to be illustrative of the present disclosure and cannot be construed as a limitation to the present disclosure. All other embodiments obtained by a person of ordinary skill in the art based on the embodiments of the present disclosure without creative efforts shall fall within the protection scope of the present disclosure. The embodiments of the present disclosure will be described in detail with reference to the accompanying drawings.

A broad embodiment of a low-floor electric axle assembly of the present disclosure is as follows.

A low-floor electric axle assembly includes an axle housing, hub motors, planetary gear reducers, hubs, a brake system, C-shaped beams, and a suspension system. Mechanical mounting of the suspension system is compatible with a conventional axle, and arrangement manners of the brake system, the hub motors, and the planetary gear reducers are capable of expanding a width of a passenger car aisle.

The axle housing has a left and right symmetrical dumbbell-shaped structure configured to bear a vehicle weight.

The hub motors are inner rotor type motors and are separately arranged at two ends of the axle housing left and right symmetrically. Each hub motor is arranged coaxially with a wheel, and a hub motor rotor is connected to the planetary gear reducer.

Each planetary gear reducer is a single-stage planetary gear reducer. A sun gear of the planetary gear reducer receives power outputted by the hub motor. A planetary gear reducer housing is a power output end connected to a rim, to transmit the power to the wheel.

Each hub is supported over a motor output shaft sleeve through a bearing, and is connected to the planetary gear reducer housing and the rim.

The brake system is a disc mechanic brake powered by variable pneumatic pressure or variable hydraulic pressure, and includes brake discs, brake calipers, and brake air chambers or hydraulic brake cylinders. Each brake disc is disposed at an output end of the hub motor rotor. The brake calipers are mounted at two ends of the axle housing, and each brake air chamber or each hydraulic brake cylinder is arranged at a hollow position of a middle beam of the axle housing.

Each C-shaped beam has a C-shaped structure, and is arranged at a side surface of each of half-cylinder structures of the two ends of the axle housing and configured to mount the hub motors.

The suspension system is a four-air-bag suspension, and an air bag assembly and a damper assembly are disposed on the C-shaped beam, and a push rod assembly is disposed on the axle housing.

The present disclosure will be further described with reference to FIG. 5 to FIG. 9.

Specific embodiments of the present disclosure are described for an axle with a load capacity of 13 tons.

Figure 7:
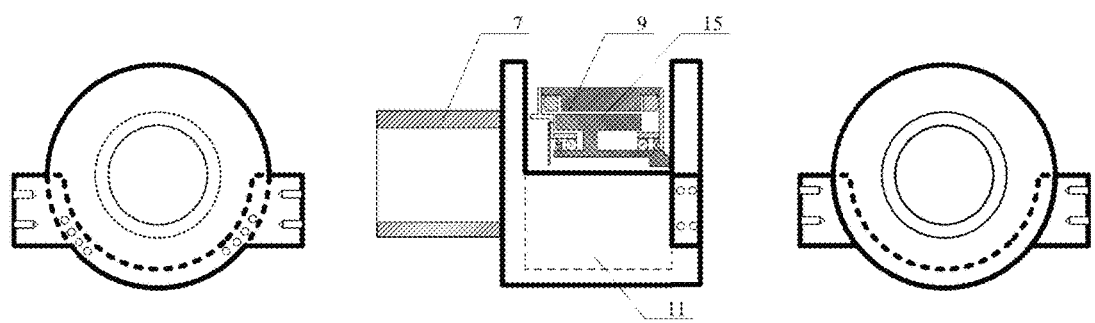
FIG. 7 is a schematic structural diagram of an end part of an axle housing of the low-floor electric axle assembly of the present disclosure.

In the low-floor electric axle assembly of the embodiments of the present disclosure, as shown in FIG. 7, two ends of an axle housing 11 have a half-cylinder shape, and a shape of each half-cylinder corresponds to a motor housing 8. Each of the half-cylinder structures is provided with a mounting hole for the motor housing 8, and the motor is disposed in the half-cylinder structure of the axle housing, so that the motor does not need to bear a weight, and it is convenient to detach the motor from an opening at a top of the half-cylinder structure. A hub 17 extends out from the opening of an end surface of the half-cylinder structure of the axle housing, and internally supports a hub motor rotor output shaft 14, a hub motor rotor output shaft sleeve 7, and the like, and is externally connected to a rim 18. In addition, a mounting structure 22 is disposed at front and rear positions of a side surface of the half-cylinder structure of the axle housing to mount the C-shaped beam 19. A suspension system is arranged on the C-shaped beam, a bracket 20 is arranged at the side surface of the half-cylinder structure of the axle housing to mount a longitudinal push rod, and a middle part of the axle housing is provided with a V-shaped bracket 21 to mount an inclined push rod. In such an arrangement, the track width and the suspension mounting are compatible with a conventional mechanic axle, and it is convenient to adopt a suspension form of four air bags. Mounting manners of connecting and limiting mechanisms, such as the push rod, etc., remain unchanged.

The low-floor electric axle assembly of the embodiments of the present disclosure is driven by inner rotor hub motors. Each of the motor specifically includes a motor stator 9, a hub motor rotor 15, and a hub motor rotor output shaft 14. The hub motor rotor output shaft 14 is fixedly connected to the hub motor rotor 15 and extends out from end surfaces of two sides of the motor. One end of the output shaft 14, which is proximate to an inner side of the wheel, is connected to the brake disc. Another end of the output shaft 14, which is proximate to an outer side of the wheel, penetrates the planetary gear reducer and is connected to the sun gear 5, and the motor housings 8, are mounted at two ends of the axle housing. An end of each motor housing 8, which is proximate to the outer side of the wheel, is provided with a sleeve 7 arranged coaxially with the hub motor rotor output shaft 14. A bearing 6 is arranged between the sleeve and the hub motor rotor output shaft 14 to support the rotor output shaft 14, and a gear ring 4 of the planetary gear reducer is fixed on the sleeve 7 as well.

In some embodiments, each in-wheel reducer of the low-floor electric axle is a single-stage high-transmission-ratio planetary gear reducer with an unconventional-structure planetary gear, thus achieving a high-transmission-ratio gear and ensuring transmission efficiency. The in-wheel reducer has a specific structure including: a planetary gear reducer housing 1 being a planet carrier and a power output end of the reducer as well; a sun gear 5 being an input end of the planetary gear reducer and fixed on the hub motor rotor output shaft 14; planetary gear pins 3, each fixed on the planetary gear reducer housing 1, to support a planetary gear 2; multiple planetary gears 2, connected to the planetary gear reducer housing 1 through the planetary gear pins 3 respectively, and meshing with the sun gear 5 respectively to receive the power inputted by the inner rotor motor; and a gear ring 4 sleeved on the planetary gears 2 and meshing with each planetary gear 2, and fixed on the hub motor rotor output shaft sleeve 7.

Specifically, each of the planetary gears 2 includes a primary gear meshing with the sun gear, and a secondary gear arranged coaxially with the primary gear and meshing with the gear ring thereon. The number of teeth of the secondary gear is less than the number of teeth of the primary gear. A formula of a speed ratio of the reducer is:

$$i_{1H} = \left(\frac{z_2}{z_1} + 1\right)\left(\frac{z_2}{z_3} + 1\right).$$

Figure 8:
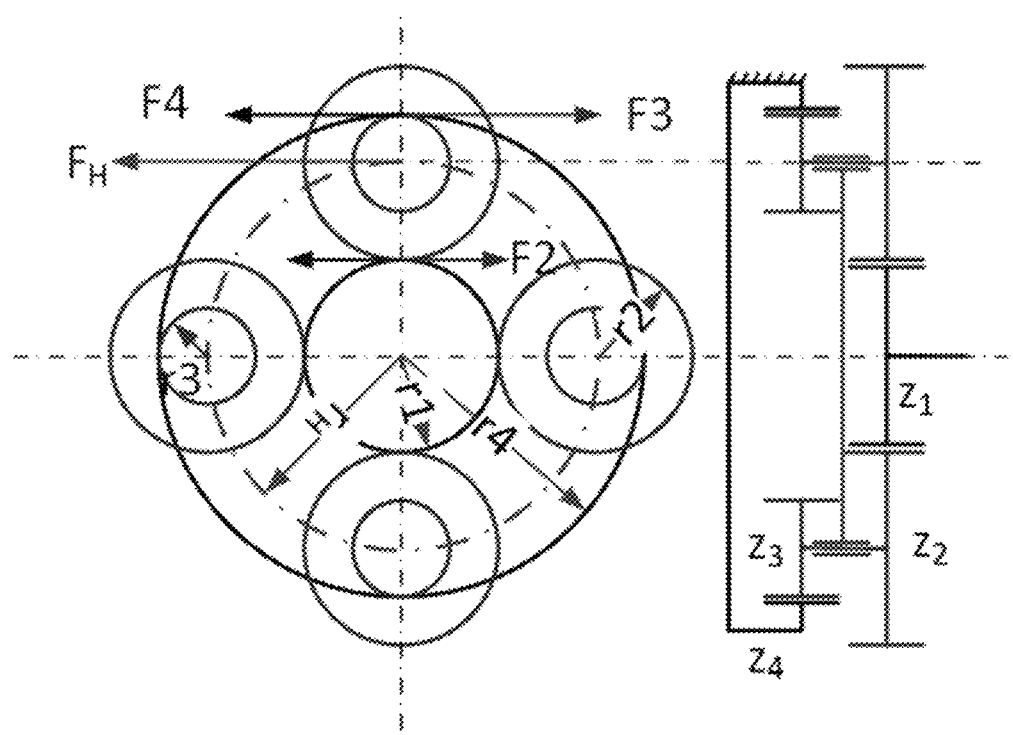
FIG. 8 is a schematic principle diagram of a single-stage high-transmission-ratio reducer with unconventional-structure planetary gears of the low-floor electric axle assembly of the present disclosure.

As shown in FIG. 8, the number of teeth of the sun gear is $z_1$, the number of teeth of the primary gear is $z_2$, the number of teeth of the secondary gear is $z_3$, and the number of teeth of the gear ring is $z_4$. To sum up, an effect achieved by adopting the primary gear and the secondary gear can be similar to the effect achieved by adopting a two-stage planetary gear reducer, thereby effectively reducing an axial length of the planetary gear reducer and an axial size of the planetary gear reducer, under the condition that the transmission ratio is ensured to be large enough.

More specifically, the planetary gear reducer housing 1 serves as the planetary carrier of the reducer as well, to output the power to the rim 18, and the entire reducer and the hub motor rotor output shaft sleeve 7 are both disposed in the reducer housing 1. A flange surface is disposed on a side of the reducer housing 1, which is proximate to the motor, and the flange surface fits a flange surface of the hub 17 and a flange surface on the rim 18. A main body of the hub is disposed inside the reducer housing 1, and a wheel main bearing 16 is arranged between the hub 17 and the hub motor rotor output shaft sleeve 7. The arrangement manner can be compatible with a dual-tire wheel of the conventional coach.

More specifically, as for the motor, a peak torque is 1600 Nm, a rated torque is 900 Nm, a peak power is 150 kW, a rated power is 90 kW, a weight is 120 kg, a diameter×a length is φ420×270 mm, and a maximum rotation speed is 5000 r/min. The speed ratio of the in-wheel reducer is 8, which can satisfy dynamic performance requirements for a vehicle with a total mass of 18 tons has a gradeability of 25% and a maximum speed of 120 km/h.

In some embodiments, the brake system is arranged at an inner side of the wheel, and the brake disc 13 is fixedly connected to an end of the hub motor rotor output shaft 14, which is located at an inner side of the wheel. Such an arrangement of the mechanic brake system disposed at the high-speed end reduces a required braking torque compared with a case of the same braking intensity, so that a diameter of the brake disc 13, a volume of a brake air chamber 10 and the like can be relatively small, thus saving more space and being beneficial to lightweight of the system. The brake calipers 12 are disposed inside the half-cylinder structures of the two ends of the axle housing 11, and the brake air chamber 10 is transversely arranged in the hollow space of the middle beam of the axle housing. Such an arrangement is beneficial to shortening of the axial length of an entire in-wheel system and widening of the coach car aisle.

Specifically, a diameter of the brake disc 13 is 320 mm, and the brake disc 13 can sustain a maximum braking torque of 2000 Nm. A maximum braking torque of the axle provided with the in-wheel reducer can be up to 32000 Nm, which can satisfy the requirement for the braking intensity of mechanic braking. The brake disc 13 is not arranged at the middle part of the wheel, thus saving the axial space inside the wheel, and enabling an axial length of the motor arranged in the rim 18 to be larger. An axial thickness of a part of the brake caliper 12 is relatively large, and the part of the brake caliper is disposed in the half-cylinder structure of the two ends of the axle housing 11, and is lower than a height of the axle aisle, so that the aisle width is not affected. The brake system is disposed at the high-speed end, which makes the volume of the brake air chamber relatively small and enables the brake air chamber to be transversely arranged in the hollow space of the middle part of the axle housing. A maximum height of the brake air chamber does not exceed a height of a top surface of the axle housing, and a ground clearance of the brake air chamber is enough. The arrangement of the mechanic brake system is beneficial to widening of the aisle of the passenger car adopting the low-floor electric axle.

Figure 9:
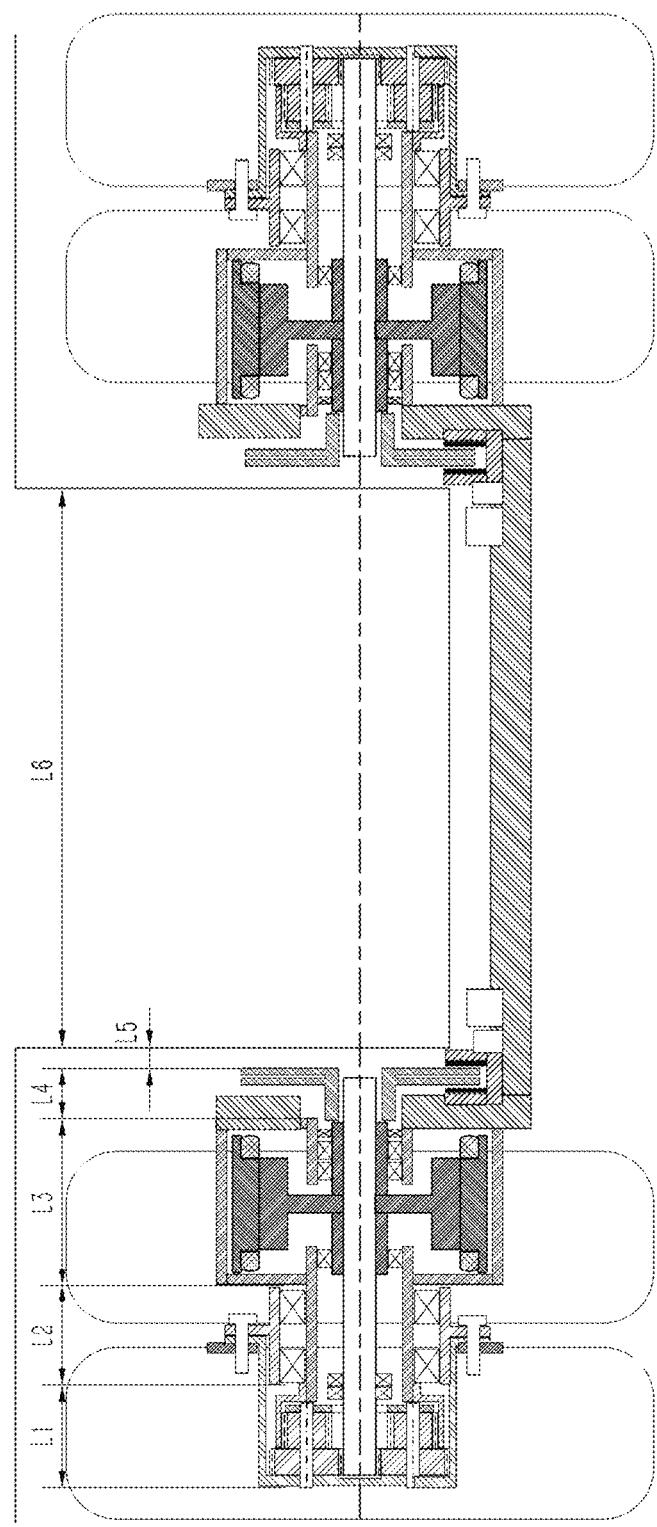
FIG. 9 is a schematic structural diagram of a low-floor electric axle assembly of 13 tons of the present disclosure.

More specifically, as for an axial length of each part of the low-floor electric axle of 13 tons, please refer to FIG. 9. An axial length L1 of the planetary gear reducer is approximately 200 mm, a distance L2 between an inner side end of the reducer and an outer side end of the motor is approximately 150 mm, and the space allows the hub 17, the hub motor rotor output shaft sleeve 7, and the hub motor rotor output shaft 14 to be arranged therein. An axial length L3 of the motor is approximately 270 mm, and an axial thickness L4 of the brake disc 13 is approximately 80 mm. In this embodiment, a total axial length of the in-wheel part at a single side of the electric axle is approximately 700 mm. A distance L5 between an in-wheel assembly and a passenger carriage is approximately 50 mm. In this case, without changing a requirement of a chassis on the mounting interface of the axle, an aisle width L6 of the electric axle of this embodiment can be up to 960 mm to 1000 mm. Generally, a track width of an axle of 13 tons is 1800 mm to 1910 mm, and a width of a middle aisle is 650 mm to 850 mm. As shown in FIG. 9, the low-floor electric axle of this embodiment effectively expands the aisle width of the low-floor electric axle.

In some embodiments, the motor and the reducer can adopt an integral direct oil cooling manner, to improve a cooling level of the motor, and to ensure lubrication and cooling effects of the reducer.

Finally, it should be noted that, the foregoing embodiments are merely intended to describe the technical solutions of the present disclosure but not to limit the present disclosure. Although the present disclosure is described in detail with reference to the foregoing embodiments, it should be understood by a person of ordinary skill in the art that modifications can be made to the technical solutions described in the foregoing embodiments, or equivalent replacements can be made to some technical features in the technical solutions, as long as such modifications or replacements do not cause the essence of corresponding technical solutions to depart from the spirit and the scope of the technical solutions of the embodiments of the present disclosure.

What is claimed is:

1. A low-floor electric axle assembly, comprising:
    an axle housing, two hub motors, two planetary gear reducers, two hubs, a brake system, two C-shaped beams, and a suspension system, wherein mechanical mounting of the suspension system is compatible with a conventional axle;
    the axle housing has a left and right symmetrical dumbbell-shaped structure configured to bear a weight of a vehicle;
    the hub motors are inner rotor type motors and are separately arranged at two ends of the axle housing left and right symmetrically; the hub motors are arranged coaxially with two wheels respectively; and two hub motor rotors are connected to the planetary gear reducers respectively;
    each of the planetary gear reducers is a single-stage planetary gear reducer; a sun gear of each of the planetary gear reducers receives power outputted by each of the hub motors; and two planetary gear reducer housings are power output ends connected to two rims respectively, to transmit the power to the wheels respectively;
    each of the hubs is supported over a motor output shaft sleeve through a bearing, and the hubs are connected to the planetary gear reducer housings respectively and connected to the rims respectively;
    the brake system is a disc mechanic brake powered by variable pneumatic pressure or variable hydraulic pressure, and comprises two brake discs, brake calipers, and brake air chambers or hydraulic brake cylinders; the brake discs are mounted at output ends of the hub motor rotors respectively; the brake calipers are mounted at the two ends of the axle housing; each of the brake air chambers or each of the hydraulic brake cylinders is arranged at a hollow position of a middle beam of the axle housing;
    each of the C-shaped beams is in a C-shaped structure, and is arranged at a side surface of each of half-cylinder structures of the two ends of the axle housing and configured to mount the hub motors; and
    the suspension system is a four-air-bag suspension, an air bag assembly and a damper assembly are disposed on each of the C-shaped beams, and a push rod assembly is disposed on the axle housing.

2. The low-floor electric axle assembly according to claim 1, wherein the two ends of the axle housing each are in a half-cylinder shape; each half-cylinder shape fits an outer contour of a corresponding hub motor of the two hub motors; and each of the half-cylinder structures is provided with a mounting hole for the corresponding hub motor.

3. The low-floor electric axle assembly according to claim 2, wherein each of the hub motors is detachably disposed in a corresponding half-cylinder structure of the axle housing from an opening at a top of the corresponding half-cylinder structure; each of the hubs and the reducer housings of the planetary gear reducers extend out from an end surface of the corresponding half-cylinder structure; the C-shaped beams configured to arrange the suspension system are respectively disposed at a front position and a rear position of a side surface of each of the half-cylinder structures of the axle housing; and a middle part of the axle housing is provided with a V-shaped bracket to mount a suspension push rod.

4. The low-floor electric axle assembly according to claim 3, wherein each of the hub motors is an inner rotor motor supported by the axle housing, and each of the hub motors bears no vehicle weight.

5. The low-floor electric axle assembly according to claim 4, wherein each of the hub motors comprises a hub motor stator, the hub motor rotor, a hub motor rotor output shaft, and a hub motor housing;
    the hub motor rotor output shaft is fixedly connected to the hub motor rotor and extends out from end surfaces of two sides of the hub motor;
    one end of the hub motor output shaft, which is proximate to an inner side of a corresponding wheel of the two wheels, is fixedly connected to a corresponding brake disc of the two brake discs; another end of the hub motor output shaft, which is proximate to an outer side of the corresponding wheel, penetrates the planetary gear reducer and is fixedly connected to the sun gear;
    the hub motor housing is disposed in the corresponding half-cylinder structure of each of the two ends of the axle housing; an end of the hub motor housing, which is proximate to the outer side of the corresponding wheel, is provided with a sleeve arranged coaxially with the hub motor rotor output shaft; a bearing is arranged between the sleeve and the hub motor rotor output shaft to support the hub motor rotor output shaft; and
    an outer side of the sleeve is fixedly connected to a gear ring of the planetary gear reducer, and the hub motor transmits the power to the hub through the planetary gear reducer.

6. The low-floor electric axle assembly according to claim 5, wherein each of the planetary gear reducers comprises the reducer housing, the sun gear, planetary gear pins, and the gear ring;
    the reducer housing is a planetary carrier of the planetary gear reducer and the power output end of the planetary gear reducer;
    the sun gear, the planetary gear pins, and the gear ring are all arranged in the reducer housing;
    the sun gear is an input end of the planetary gear reducer, and is fixedly connected to the hub motor rotor output shaft;
    the planetary gear pins each are fixed on the reducer housing to support a planetary gear;
    multiple planetary gears each are connected to the reducer housing through respective planetary gear pins, and mesh with the sun gear to transmit the power inputted by the hub motor; and the gear ring is sleeved on the planetary gears and meshed with the planetary gears and fixed on a hub motor rotor output shaft sleeve.

7. The low-floor electric axle assembly according to claim 6, wherein each of the planetary gears comprises a primary gear and a secondary gear; and in each of the planetary gears, the primary gear meshes with the sun gear, the secondary gear is arranged coaxially with the primary gear and meshes with the gear ring, and a number of teeth of the secondary gear is less than a number of teeth of the primary gear.

8. The low-floor electric axle assembly according to claim 7, wherein the hub motor rotor output shaft sleeve is arranged in the reducer housing; a flange surface is disposed on a side of the reducer housing, which is proximate to the hub motor; the flange surface fits a flange surface of the hub and a flange surface on the rim; a main body of the hub is disposed inside the reducer housing; and a wheel main bearing is arranged between the hub and the hub motor rotor output shaft sleeve.

9. The low-floor electric axle assembly according to claim 8, wherein the brake system is arranged at an inner side of the wheel, and the brake disc is fixedly connected to an end of the hub motor rotor output shaft, which is located at an inner side of the wheel, to reduce a braking torque, and a diameter of the brake disc, and a volume of the brake air chamber or the hydraulic brake cylinder are relatively small.

10. The low-floor electric axle assembly according to claim 9, wherein the brake calipers are disposed inside the half-cylinder structures of the two ends of the axle housing, and the brake air chamber or the hydraulic brake cylinder is transversely arranged in hollow space of the middle beam of the axle housing.

11. The low-floor electric axle assembly according to claim 10, wherein the C-shaped beam for mounting the air bag assembly and a mounting structure for mounting a longitudinal push rod assembly are arranged at an inner side surface of the half cylinder structure of the axle housing; and a V-shaped bracket for mounting an inclined push rod assembly is arranged in the middle part of the axle housing.

12. The low-floor electric axle assembly according to claim 1, wherein the hub motors and the planetary gear reducers adopt an integral direct oil cooling manner.

* * * * *